(12) United States Patent
Harayama

(10) Patent No.: US 10,532,516 B2
(45) Date of Patent: Jan. 14, 2020

(54) SHAPING METHOD, SHAPING SYSTEM, AND SHAPING DEVICE

(71) Applicant: MIMAKI ENGINEERING CO., LTD., Nagano (JP)

(72) Inventor: Kenji Harayama, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 115 days.

(21) Appl. No.: 15/703,989

(22) Filed: Sep. 14, 2017

(65) Prior Publication Data
US 2018/0079140 A1 Mar. 22, 2018

(30) Foreign Application Priority Data

Sep. 16, 2016 (JP) .................................. 2016-181412

(51) Int. Cl.
| | | |
|---|---|---|
| *B29C 64/393* | (2017.01) | |
| *B33Y 50/02* | (2015.01) | |
| *B33Y 50/00* | (2015.01) | |
| *B29C 64/386* | (2017.01) | |
| *B29C 64/20* | (2017.01) | |
| *B29C 64/227* | (2017.01) | |
| *B29C 64/135* | (2017.01) | |

(52) U.S. Cl.
CPC .......... *B29C 64/393* (2017.08); *B29C 64/386* (2017.08); *B33Y 50/00* (2014.12); *B33Y 50/02* (2014.12); *B29C 64/135* (2017.08); *B29C 64/20* (2017.08); *B29C 64/227* (2017.08); *B29K 2995/0018* (2013.01); *B29K 2995/0021* (2013.01)

(58) Field of Classification Search
None
See application file for complete search history.

(56) References Cited

U.S. PATENT DOCUMENTS

2014/0104337 A1* 4/2014 Fujita ................... G06K 15/186
347/15
2015/0321425 A1* 11/2015 Stava ...................... G06F 17/50
700/98

FOREIGN PATENT DOCUMENTS

JP 2015071282 4/2015

* cited by examiner

*Primary Examiner* — Mohammad Ali
*Assistant Examiner* — Saad M Kabir
(74) *Attorney, Agent, or Firm* — JCIPRNET

(57) ABSTRACT

The shaping method for shaping a 3D object includes shaping execution data generating step of generating shaping execution data indicating the 3D object in a format corresponding to a shaping device; and shaping executing step of shaping the 3D object with the shaping device based on the shaping execution data, the 3D object being shaped using at least a shaping material of plural colors, wherein the shaping execution data generating step is a step of generating the shaping executing data based on 3D object data indicating the 3D object in which at least one part is colored, the shaping execution data being generated by at least carrying out color conversion using a shaping material profile or a profile corresponding to the shaping material of plural colors, and the color conversion being carried out using the plurality of shaping material profiles different from each other.

17 Claims, 6 Drawing Sheets

SHAPING METHOD, SHAPING SYSTEM, AND SHAPING DEVICE

CROSS REFERENCE TO RELATED APPLICATIONS

This application claims the priority benefit of Japanese Patent Application No. 2016-181412, filed on Sep. 16, 2016. The entirety of the above-mentioned patent application is hereby incorporated by reference herein and made a part of this specification.

TECHNICAL FIELD

The present disclosure relates to a shaping method, a shaping system, and a shaping device.

DESCRIPTION OF THE BACKGROUND ART

A shaping device (three-dimensional printer (3D printer)) that shapes a three-dimensional object (3D object) using an inkjet head is conventionally known (see e.g., Japanese Unexamined Patent Publication No. 2015-71282).

In such a shaping device, for example, the 3D object is shaped through a layering and shaping method by overlapping a plurality of layers of ink formed by the inkjet head.

SUMMARY

In recent years, shaping a colored 3D object is being considered as a method of shaping carried out using the shaping device. In this case, for example, the 3D object is colored by forming a surface of the 3D object using inks of plural colors different from each other. Furthermore, in this case, for example, various colors are represented using the inks of plural colors such as, for example, C (cyan), M (magenta), Y (yellow), K (black), and the like, similar to when carrying out color printing with the inkjet printer that prints a two-dimensional image.

However, when carrying out coloring with the shaping device, various conditions are believed to differ from the inkjet printer. Thus, a method for shaping the colored 3D object with a method more suited for the shaping device is conventionally desired. The present disclosure thus provides a shaping method, a shaping system, and a shaping device that can solve the problem described above.

The inventors of the present application carried out an intensive research on the manner of coloring the 3D object. Furthermore, in such intensive research, for example, focus was made on the difference, and the like from when carrying out color printing with the inkjet printer. More specifically, when carrying out color printing with the inkjet printer, the color printing is usually carried out through the subtractive color mixing method by discharging ink of each color of CMYK on a medium (media) having a light reflective color. In this case, one thin layer of ink is usually formed on the medium by the discharging of ink of each color.

When carrying out coloring at the time of shaping of the 3D object, on the other hand, the coloring is carried out, for example, by forming a coloring region in a portion of a surface that can be visually recognized from the outside in the 3D object. Furthermore, in this case, for example, various colors are represented with the subtractive color mixing method, similar to the color printing with the inkjet printer, by forming a light reflective region on an inner side of the coloring region. At the time of shaping of the 3D object, the coloring region is usually formed with a thickness (thick) of a certain extent, taking into consideration that the 3D object may be observed from different directions, the color is not easily changed even if cracks and chips forms to a certain extent at the surface of the 3D object, and the like.

However, the inventors of the present application found out through the intensive research that when thickening the coloring region, the size of a gamut, which is a range of color that can be represented, becomes small and the desired color may not be appropriately represented. More specifically, for example, the inventors found out that when forming a layer of ink that is thick compared to the layer of ink formed at the time of the color printing with the inkjet printer, the range of brightness of the color that can be represented and the range of color become small, and various colors become difficult to be represented appropriately.

The inventors of the present application found out through further intensive research that in a color conversion carried out in accordance with the coloring ink used in shaping before the execution of the shaping, various colors can be represented at the time of shaping of the 3D object by using a plurality of profiles for a profile (device profile) for conversion. Moreover, the inventors discovered through still further intensive research the features necessary for obtaining such effect, and contrived the present disclosure.

To solve the problems described above, the present disclosure provides a shaping method for shaping a stereoscopic 3D object, the shaping method including shaping execution data generating step of generating shaping execution data or data indicating the 3D object in a format corresponding to a shaping device that executes an operation of shaping; and shaping executing step of shaping the 3D object with the shaping device based on the shaping execution data, the 3D object being shaped using at least a shaping material of plural colors; where the shaping execution data generating step is a step of generating the shaping executing data based on 3D object data or data indicating the 3D object in which at least one part is colored, the shaping execution data being generated by at least carrying out color conversion using a shaping material profile or a profile corresponding to the shaping material of plural colors, and the color conversion being carried out using the plurality of shaping material profiles different from each other.

According to such configuration, for example, a wider range of colors can be appropriately represented at the time of shaping of the 3D object. Furthermore, for example, the colored 3D object can be appropriately shaped with the method more suited for the shaping device.

An ink, and the like, which is a liquid discharged from the inkjet head, for example, can be suitably used for the material of shaping. Furthermore, an ultraviolet curing type ink, for example, can be suitably used for such ink. A material of each color of CMYK, for example, can be suitably used for the shaping material of plural colors. Furthermore, the shaping device shapes, for example, the 3D object through the layering and shaping method. A plurality of profiles in which a color reproducing region differs from each other, for example, are preferably used for each of the plurality of shaping material profiles. In this case, consideration is made to using the plurality of profiles, and the like in which the size of the gamut differs from each other.

Moreover, in this case, the plurality of shaping material profiles are used, for example, in the process of color conversion with respect to positions different from each other in the process of generating the shaping execution data indicating one 3D object. According to such configuration, for example, the shaping material profile that can represent the relevant color can be used in accordance with the relevant color represented at each position of the 3D object. Furthermore, the color of the entire 3D object thus can be more appropriately represented even if the color of the entire 3D object cannot be appropriately represented with one shaping material profile.

In this shaping method, the 3D object including the light reflective region and the coloring region, for example, is shaped in the shaping device. Furthermore, in this case, the color region is, for example, formed on the outer side of the light reflective region. In such configuration, consideration is made to using a profile used when forming the coloring region at different thickness, for example, for the plurality of shaping material profiles. In this case, each of the plurality of shaping material profiles is corresponded to, for example, the different thickness of the coloring region. The thickness of the coloring region is, for example, the thickness in a normal direction of the 3D object. Furthermore, in the shaping executing step, for example, the shaping device forms each portion of the coloring region at a thickness corresponding to the shaping material profile used for the color conversion with respect to the relevant portion. When configured in such manner, for example, various colors can be more appropriately represented by changing the thickness of the coloring region depending on the position of the 3D object. Thus, the color conversion suited to the configuration of such 3D object, for example, can be more appropriately carried out.

Furthermore, in this configuration, a profile for converting the Lab value to a color represented with the shaping material of plural colors, for example, can be suitably used for the shaping material profile. In this case, in the shaping execution data generating step, the color represented in the 3D object data is converted to the Lab value, and the color conversion based on the plurality of shaping material profiles is further carried out with respect to the Lab value. According to such configuration, for example, the color conversion using the plurality of shaping material profiles can be appropriately carried out.

The shaping method according to the present disclosure can also be considered as, for example, a manufacturing method of the 3D object. Furthermore, consideration is also made to using the shaping system, the shaping device, and the like having features similar to the above for the configuration of the present disclosure. In such cases as well, for example, effects similar to the above can be obtained.

According to the present disclosure, for example, the colored 3D object can be appropriately shaped with the method more suited for the shaping device.

BRIEF DESCRIPTION OF THE DRAWINGS

FIG. 1A shows one example of a configuration of the shaping system 10. FIG. 1B is a cross-sectional view showing one example of a configuration of a 3D object 50 shaped by a shaping device 100 along with a support layer 70.

FIG. 2A shows one example of a configuration of a main part of the shaping device 100. FIG. 2B shows one example of a more detailed configuration of a head unit 102.

FIG. 3A is a cubic diagram of a gamut indicating a range of color and brightness that can be represented. FIG. 3B is a view describing hue and chroma that can be represented by the coloring region 56 in further detail.

FIGS. 6A to 6C schematically show one part of the operation carried out in the host PC 200.

DETAILED DESCRIPTION OF EMBODIMENTS

Figure 1A:
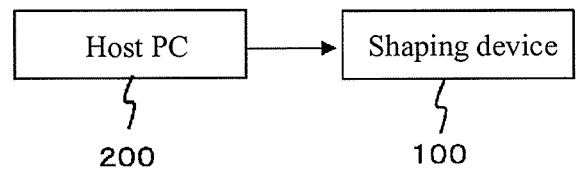
FIGS. 1A and 1B are views describing a shaping system 10 that executes a shaping method according to one embodiment of the present disclosure.
Figure 1B:
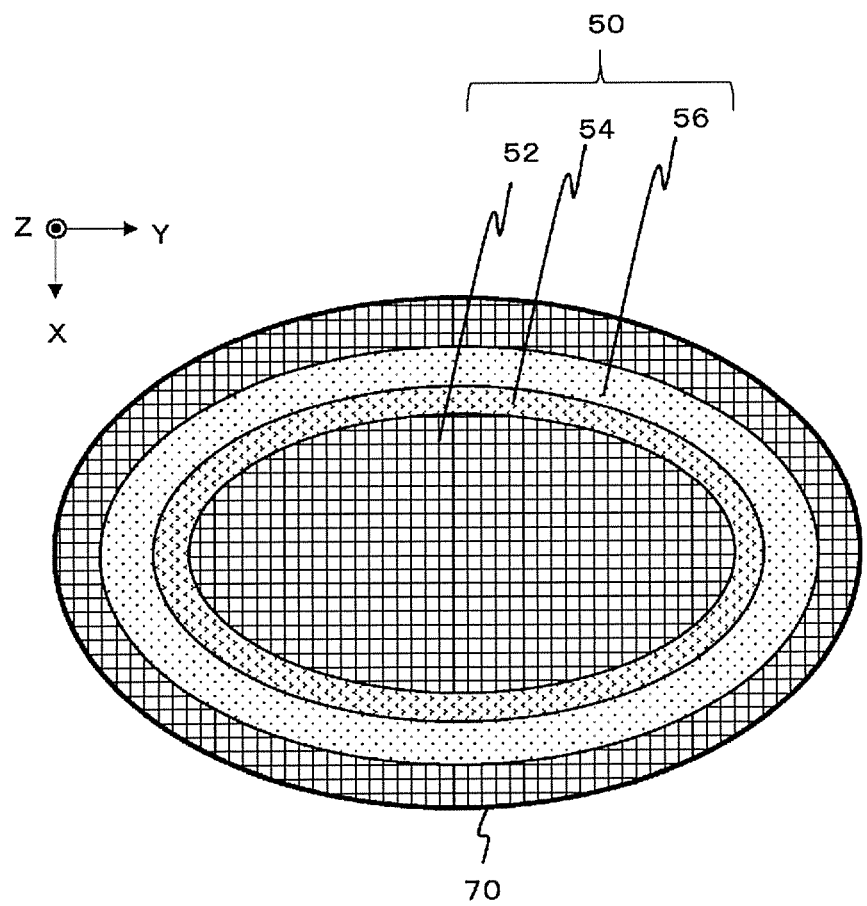

Hereinafter, an embodiment of the present disclosure will be described with reference to the drawings. FIGS. 1A and 1B are views describing a shaping system 10 that executes a shaping method according to one embodiment of the present disclosure. FIG. 1A shows one example of a configuration of the shaping system 10.

In the present example, the shaping system 10 is a system that shapes a stereoscopic 3D object, and includes a shaping device 100 and a host PC (personal computer) 200. The shaping device 100 is a shaping device (3D printer) that executes the operation of shaping, and shapes the 3D object through a layering and shaping method. In this case, the layering and shaping method is, for example, a method of shaping the 3D object by overlapping a plurality of layers. The 3D object is, for example, a stereoscopic three-dimensional structure. Furthermore, the shaping device 100 uses an ink that cures according to a predetermined condition for the material of shaping. A more specific configuration, and the like of the shaping device 100 will be described in more detail later.

The host PC 200 is a computer that controls the operation of the shaping device 100. In the present example, the host PC 200 is an example of a shaping execution data generating device, and generates shaping execution data, which is data indicating the 3D object in a format corresponding to the shaping device 100, based on the 3D object data, which is data indicating the 3D object to shape. Furthermore, when the generated shaping execution data is provided to the shaping device 100, the shaping device 100 is caused to execute the operation of shaping. The processing, and the like of the data carried out in the host PC 200 will also be described in further detail later.

In the present example, the 3D object data is data of a 3D model prepared by a user. The data of the 3D model is, for example, the three-dimensional data indicating a stereoscopic object. General-purpose three-dimensional data that does not depend on the model of the shaping device 100 can be suitably used for the 3D object data.

FIG. 1B is a cross-sectional view showing one example of a configuration of a 3D object 50 shaped by the shaping device 100 along with a support layer 70, and schematically shows a configuration of a cross-section of the 3D object 50 taken at a plane perpendicular to a layering direction (Z direction), which is a direction the material of shaping is layered in the layering and shaping method. In the illustrated case, the 3D object 50 is an oval spherical three-dimensional object. In this case, for example, the configurations of the cross-sections of the 3D object 50 taken at planes perpendicular to the X direction and the Y direction in the figure are also the same as or similar to the illustrated configuration. More specifically, in the present example, the 3D object 50 includes an interior region 52, a light reflective region 54, and a coloring region 56. Each of such regions is formed to line in such order from the interior to the exterior of the 3D object 50.

As will be described later in further detail, in the present example, the color region 56 is formed not to an even thickness but so as to have a different thickness depending on the position. A more specific features of the coloring region 56 in which the coloring region 56 is illustrated at an even thickness for the sake of convenience of illustration in FIG. 1B will be described in further detail later.

The interior region 52 is a region (model layer) on the interior of the 3D object 50 constituting the shape of the 3D object 50. In the present example, the interior region 52 is formed using a shaping material ink, which is an ink dedicated for shaping. Furthermore, the interior region 52 may be formed using ink other than the shaping material ink. In this case, for example, consideration is made to forming the interior region 52 using various inks other than the material of the support layer 70. More specifically, for example, the interior region 52 may be formed using a coloring ink (color ink), and the like. Furthermore, for example, the interior region 52 may be formed using a white ink, a clear ink of colorless transparent color (T) and the like.

The light reflective region 54 is a region having light reflecting property formed with a material having a property of reflecting light, and reflects the light entering from the surface side of the 3D object 50 through the coloring region 56. The coloring in the subtractive color mixing method can be appropriately carried out, for example, by forming the light reflective region 54 on the inner side of the coloring region 56. Furthermore, in the present example, the light reflective region 54 is formed using the white (W) ink.

The coloring region 56 is a region (surface color layer) where coloring is performed by the coloring ink. Furthermore, in the present example, the coloring region 56 is a layer-like region that lies along the surface shape of the 3D object 50, and is formed using coloring inks of plural colors, and the clear ink. In this case, the coloring inks of plural colors are an example of the shaping materials of plural colors. Furthermore, for example, consideration is made to using colors of cyan (C), magenta (M), yellow (Y), and black (K) for the coloring ink. The ink of each color is an example of an ink of each color of the process color. The coloring ink is not limited to the ink of such colors, and ink of other colors may be further used. For example, an ink of a specific color such as a white ink, and the like may be further used. Furthermore, in the present example, various colors are represented by adjusting the discharging amount of the coloring ink of each color with respect to each position of the coloring region 56.

In this case, a difference may be created in the total amount (discharging amount per unit volume) of coloring ink due to the difference in the color to represent. Thus, in the present example, the coloring region 56 is formed by further using the clear ink to complement the change in the total amount of coloring ink created by the difference in color. According to such configuration, for example, the coloring region 56 colored by the coloring ink can be appropriately formed.

As shown in the figure, in the present example, the support layer 70 is formed at the periphery of the 3D object 50, as necessary. In this case, for example, the support layer 70 is a layered structure that supports the 3D object 50 by surrounding the outer periphery of the 3D object 50 being shaped. The support layer 70 is, for example, a layer formed with a water soluble material, and is formed as necessary at the time of shaping of the 3D object 50, and removed after the shaping is completed.

The configuration of the 3D object 50 is not limited to the configuration described above, and various changes can be made. For example, consideration is also made to integrally forming the interior region 52 with the light reflective region 54 without distinguishing the relevant regions. In this case, for example, the interior region 52 and the light reflective region 54 are integrally formed using a light reflective ink such as a white ink. Consideration is also made to further forming a region other than the above, and the like according to the quality, and the like demanded on the 3D object 50. In this case, for example, consideration is made to forming a transparent region (interior clear region) with a clear ink between the light reflective region 54 and the coloring region 56. The mixing of ink can be appropriately prevented from occurring between the light reflective region 54 and the coloring region 56, for example, by forming such interior clear region. Furthermore, for example, consideration is made to forming a transparent region (surface clear region) for protecting the outer surface of the 3D object 50 on the outer side of the coloring region 56. For example, the coloring region 56, and the like can be appropriately protected by forming such surface clear region.

Figure 2A:
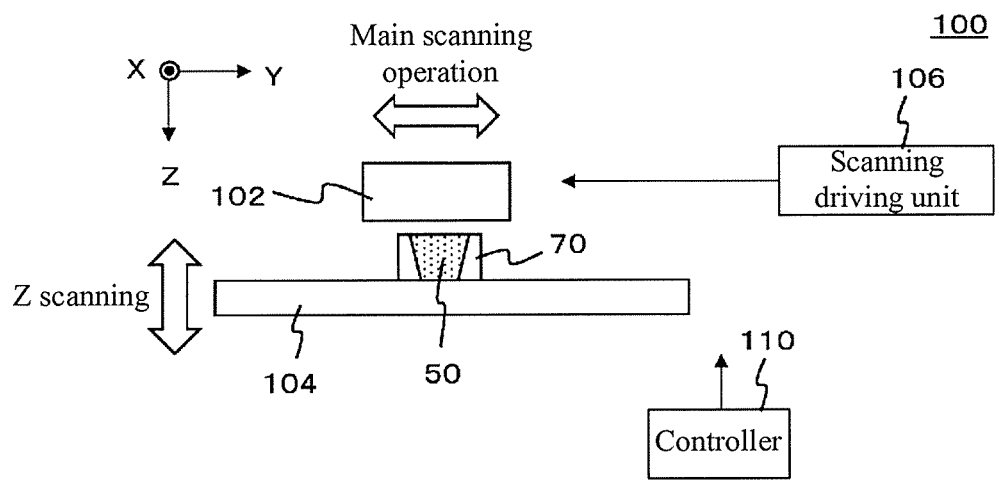
FIGS. 2A and 2B are views describing one example of the shaping device 100.
Figure 2B:
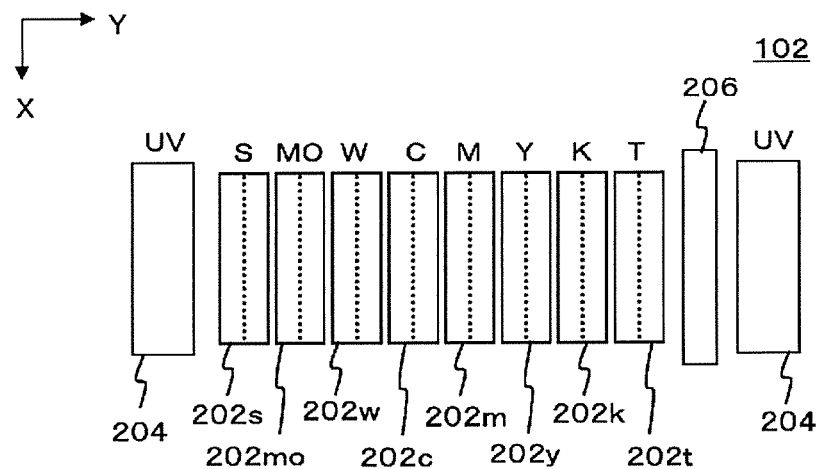

Next, a more specific configuration of the shaping device 100 will be described. FIGS. 2A and 2B are views describing one example of the shaping device 100. FIG. 2A shows one example of a configuration of a main part of the shaping device 100.

Excluding the points described below, the shaping device 100 may have a configuration same as or similar to the known shaping device. More specifically, excluding the points described below, the shaping device 100 may, for example, have a configuration same as or similar to the known shaping device that carries out shaping by discharging a liquid droplet to become the material of the 3D object 50 using the inkjet head. Furthermore, the shaping device 100 may, for example, further include various types of configurations necessary for shaping, coloring, and the like of the 3D object 50 other than the illustrated configuration.

In the present example, the shaping device 100 includes a head unit 102, a shaping table 104, a scanning driving unit 106, and a control unit 110. The head unit 102 is a portion that discharges the liquid droplet to become the material of the 3D object 50, and forms each layer constituting the 3D object 50 in an overlapping manner by discharging and curing an ink droplet of an ink that cures according to a predetermined condition. In this case, the ink is, for example, a liquid discharged from the inkjet head. The inkjet head is, for example, a discharging head that discharges the liquid droplet of the ink (ink droplet) through an inkjet method. In the present example, the head unit 102 includes a plurality of inkjet heads and an ultraviolet light source. A more specific configuration of the head unit 102 will be described later in detail.

The shaping table 104 is a table-shaped member that supports the 3D object 50 being shaped and is arranged at a position facing the inkjet head in the head unit 102, where the 3D object 50 being shaped is mounted on an upper surface thereof. Furthermore, in the present example, the shaping table 104 has a configuration in which at least the upper surface is movable in the layering direction, where at least the upper surface moves in accordance with the progress in the shaping of the 3D object 50 by being driven by the scanning driving unit 106. Furthermore, in the present example, the layer direction is a direction (Z direction in the figure) orthogonal to a main scanning direction (Y direction in the figure) and a sub-scanning direction (X direction in the figure) set in advance in the shaping device 100.

The scanning driving unit 106 is a driving unit that causes the head unit 102 to carry out a scanning operation of relatively moving with respect to the 3D object 50 being shaped. In this case, relatively moving with respect to the 3D object 50 being shaped means, for example, relatively moving with respect to the shaping table 104. Furthermore, causing the head unit 102 to carry out the scanning operation means, for example, causing the inkjet head of the head unit 102 to carry out the scanning operation. Moreover, in the present example, the scanning driving unit 106 causes the head unit 102 to carry out a main scanning operation (Y scanning), a sub-scanning operation (X scanning), and a layering direction scanning (Z scanning).

The main scanning operation is, for example, an operation of discharging ink while moving in the main scanning direction. In the present example, the scanning driving unit 106 causes the head unit 102 to carry out the main scanning operation by fixing the position of the shaping table 104 in the main scanning direction and moving the head unit 102 side. In a variant of the configuration of the shaping device 100, for example, the 3D object 50 side may be moved by fixing the position of the head unit 102 in the main scanning direction and moving the shaping table 104.

As will be described in detail below, the head unit 102 further includes an ultraviolet light source in the present example. At the time of the main scanning operation, the scanning driving unit 106 further carries out the drive of the ultraviolet light source in the head unit 102. More specifically, the scanning driving unit 106, for example, turns ON the ultraviolet light source at the time of the main scanning operation to cure the ink that landed on a surface-to-be-shaped of the 3D object 50. The surface-to-be-shaped of the 3D object 50 refers to, for example, a surface on which a next layer of ink is formed by the head unit 102.

The sub-scanning operation is, for example, an operation of relatively moving with respect to the shaping table 104 in the sub-scanning direction orthogonal to the main scanning direction. More specifically, the sub-scanning operation is, for example, an operation of relatively moving with respect to the shaping table 104 in the sub-scanning direction by a feeding amount set in advance. Furthermore, in the present example, the scanning driving unit 106 causes the head unit 102 to carry out the sub-scanning operation between the main scanning operations. In this case, the scanning driving unit 106 causes the head unit 102 to carry out the sub-scanning operation by, for example, fixing the position of the head unit 102 in the sub-scanning direction and moving the shaping table 104. Furthermore, the scanning driving unit 106 may cause the head unit 102 to carry out the sub-scanning operation by fixing the position of the shaping table 104 in the sub-scanning direction and moving the head unit 102. The scanning driving unit 106 causes the head unit 102 to carry out the sub-scanning operation, only when necessary, according to the size of the 3D object 50 to shape. Thus, when shaping the 3D object 50 of a small size, and the like, for example, the 3D object 50 may be shaped without carrying out the sub-scanning operation.

Furthermore, the layering direction scanning is, for example, an operation of relatively moving the head unit 102 in the layering direction with respect to the 3D object 50 by moving at least one of the head unit 102 and the shaping table 104 in the layering direction. In this case, moving the head unit 102 in the layering direction means, for example, moving at least the inkjet head in the head unit 102 in the layering direction. Furthermore, moving the shaping table 104 in the layering direction means, for example, moving the position of at least the upper surface in the shaping table 104.

The scanning driving unit 106 adjusts a relative position of the inkjet head with respect to the 3D object 50 being shaped in the layering direction by causing the head unit 102 to carry out the layering direction scanning in accordance with the progress in the operation of shaping. More specifically, in the present example, the scanning driving unit 106 fixes the position of the head unit 102 in the layering direction, and moves the shaping table 104. The scanning driving unit 106 may fix the position of the shaping table 104 in the layering direction, and move the head unit 102.

The control unit 110 is, for example, a CPU of the shaping device 100, and controls each unit of the shaping device 100 to control the operation of shaping of the 3D object 50. In this case, the control unit 110 controls each unit of the shaping device 100 based on, for example, shape information, color image information, and the like of the 3D object 50 to be shaped. More specifically, in the present example, the shaping device 100 shapes the 3D object 50 by carrying out shaping according to the shaping execution data received from the host PC 200 (see FIGS. 1A and 1B). The shaping execution data received by the shaping device 100 will be described later in further detail in the description on the operation of the host PC 200, and the like. According to the present example, the 3D object 50 can be appropriately shaped.

Next, a more specific configuration of the head unit 102 will be described. FIG. 2B shows one example of a more detailed configuration of a head unit 102. In the present example, the head unit 102 includes a plurality of inkjet heads 202s, 202mo, 202w, 202c, 202m, 202y, 202k, 202t (hereinafter referred to as inkjet heads 202s to 202t), a plurality of ultraviolet light sources 204, and a flattening roller 206.

The inkjet heads 202s to 202t are discharging heads that discharge an ink droplet through the inkjet method. Furthermore, in the present example, the inkjet heads 202s to 202t are inkjet heads that discharge an ink droplet of an ultraviolet curing type ink, and are arranged to line in a main scanning direction (Y direction) with the positions in the sub-scanning direction (X direction) aligned. In this case, the ultraviolet curing type ink is, for example, an ink that cures in response to the irradiation of the ultraviolet light. A known inkjet head, for example, can be suitably used for the inkjet heads 202s to 202t. Furthermore, such inkjet heads have, for example, a nozzle row in which a plurality of nozzles are lined in the sub-scanning direction on a surface facing the shaping table 104.

The arrangement of the inkjet heads 202s to 202t is not limited to the illustrated configuration, and may be variously changed. For example, some inkjet heads may be arranged such that the positions in the sub-scanning direction are shifted from the other inkjet heads. Furthermore, the head unit 102 may further include an inkjet head for other colors.

The inkjet head 202s is an inkjet head that discharges the ink droplet containing the material of the support layer 70. A water soluble material that can be dissolved in water after the shaping of the 3D object 50, for example, is suitably used for the material of the support layer 70. In this case, a material of which cure degree by the ultraviolet light is weaker and which is more easily decomposed than the shaping material used in the shaping of the 3D object 50 is preferably used. More specifically, a known material for the support layer, for example, can be suitably used for the material of the support layer 70.

The inkjet head 202mo is an inkjet head that discharges an ink droplet of a shaping material ink (model material MO) of a predetermined color. The inkjet head 202w is an inkjet head that discharges an ink droplet of a white (W) ink.

Each of the plurality of inkjet heads 202c, 202m, 202y, 202k (hereinafter referred to as inkjet heads 202c to 202k) is an inkjet head that discharges an ink droplet of an ink of a chromatic color for coloring. In the present example, the inkjet heads 202c to 202k discharge the ink droplet of the ultraviolet curing type ink of each color of CMYK. Moreover, the inkjet head 202t is an inkjet head that discharges an ink droplet of a clear ink.

The plurality of ultraviolet light sources 204 have a configuration for curing the ink, and generate the ultraviolet light for curing the ultraviolet curing type ink. An UVLED (ultraviolet LED), and the like, for example, can be suitably used for the ultraviolet light source 204. Furthermore, consideration is also made to using a metal halide lamp, a mercury lamp, and the like for the ultraviolet light source 204. Moreover, in the present example, each of the plurality of ultraviolet light sources 204 is arranged at each of one end side and another end side in the main scanning direction in the head unit 102 so as to sandwich the arrangement of the inkjet heads (inkjet heads 202s to 202t) in between.

The flattening roller 206 is a flattening means (flattening unit) for flattening the layer of ink formed during the shaping of the 3D object 50. In the present example, the flattening roller 206 is, for example, arranged between the arrangement of the inkjet heads and the ultraviolet light source 204. The layer of ink layered in the layering and shaping method can be flattened, and the thickness of the layer of ink can be appropriately adjusted at high precision, for example, by using the flattening roller 206. Thus, the operation of shaping in the layering and shaping method, for example, can be appropriately carried out at high precision.

Next, the processing, and the like of data carried out in the host PC 200 will be described in more detail. The operation described below is the operation of when shaping the 3D object 50 in which the surface is colored, as described using FIG. 1B, for example. In relation to the processing, and the like of data in the host PC 200, first, the range of color that can be represented by forming the coloring region 56 in the 3D object 50 with the shaping device 100 will be described.

As described above, when shaping the colored 3D object 50 through the layering and shaping method, various colors are represented through the subtractive color mixing method by forming the coloring region 56 with the coloring ink at the periphery of the light reflective region 54. In this case, the light that entered the coloring region 56 from outside the 3D object 50 is reflected by the light reflective region 54 thus exiting to the outside of the 3D object 50. Thus, the range of color and brightness that can be represented by the coloring region 56 is influenced by the amount of light absorbed when transmitting through the coloring region 56.

When shaping the 3D object 50, the coloring region 56 is usually formed with a thickness of a certain extent taking into consideration that the 3D object 50 may be observed from various directions, the color is prevented from easily changing even if cracks and chips are formed to a certain extent at the surface of the 3D object 50, and the like. Thus, at the time of shaping of the colored 3D object 50, it can also be assumed that the absorption amount of light in the coloring region 56 will become large and the influence on the range of color and brightness that can be represented will become large.

Figure 3A:
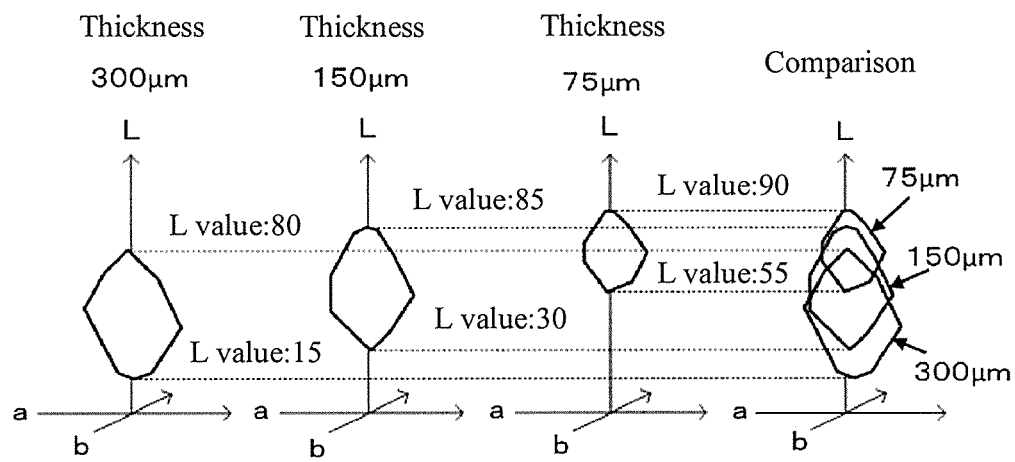
FIGS. 3A and 3B are views describing a relationship of the thickness of the coloring region 56 and the range of color and brightness that can be represented in the coloring region 56.
Figure 3B:
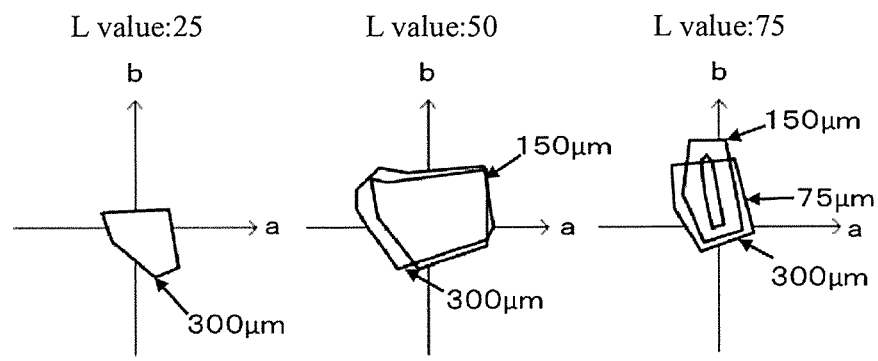

FIGS. 3A and 3B are views describing the relationship of the thickness of the coloring region 56 and the range of color and brightness that can be represented in the coloring region 56. FIG. 3A is a cubic diagram of a gamut (color gamut) indicating the range of color and brightness that can be represented, and shows one example of the gamut for a case in which the thickness of the coloring region 56 is variously differed. In the illustrated case, the thickness of the coloring region 56 is set to each of 300 μm, 150 μm, and 75 μm. The gamut is also indicated with a Lab color coordinate system. In a comparison diagram on the rightmost side in FIG. 3A, the gamut corresponding to the respective thicknesses is shown in an overlapping manner.

As shown in the figure, the range and size of the gamut change when the thickness of the coloring region 56 is variously differed. In this case, the range of an L value within the gamut tends to become large as the thickness of the coloring region 56 becomes thin. Thus, it is preferable to have the coloring region 56 thin in order to represent a bright color. Furthermore, it is preferable to have the coloring region 56 thick in order to represent a dark color. Moreover, hue and chroma that can be represented also change when the thickness of the coloring region 56 is variously differed. More specifically, for example, when the coloring region 56 is made thin, as shown in the figure, the range of hue and chroma that can be represented tends to become narrow.

FIG. 3B is a view describing the hue and chroma that can be represented by the coloring region 56 in more detail, and shows one example of a range of chromaticity that can be represented at the respective thicknesses of the coloring region 56 with a cross-sectional view of the gamut in an ab plane for a case in which the L value is fixed at 25, 50, and 75. As shown in the figure, when choosing the thickness of the coloring region 56 from the thicknesses of 300 μm, 150 μm, and 75 μm, the representation of color is possible only when the thickness is 300 μm if the L value is fixed at 25. Furthermore, the representation of color is possible when the thickness is 300 μm and 150 μm if the L value is fixed at 50. In this case, the range of hue and chroma that can be represented at the respective thicknesses is different. Furthermore, in this case, the range is generally wider for the case of 300 μm. Moreover, the representation of color is possible for all cases of when the thickness is 300 μm, 150 μm, and 75 μm if the L value is fixed at 75. In this case, the range of hue and chroma that can be represented at the respective thicknesses is different. Furthermore, in this case, the range of hue and chroma that can be represented generally becomes wider as the thickness of the coloring region 56 becomes thicker.

Therefore, the range of color and brightness that can be represented in the coloring region 56 variously changes by the thickness of the coloring region 56. Thus, when shaping the colored 3D object 50, how to set the thickness of the coloring region 56 becomes important.

The inventors of the present application, on the other hand, considered forming the coloring region 56 not at an even thickness but so that the thickness differs depending on the position, as has been described above. More specifically, the inventors considered carrying out color conversion using a plurality of device profiles as a method for forming the coloring region 56 in such manner. The process of color conversion, and the like carried out in the present example will be described below.

Figure 4:
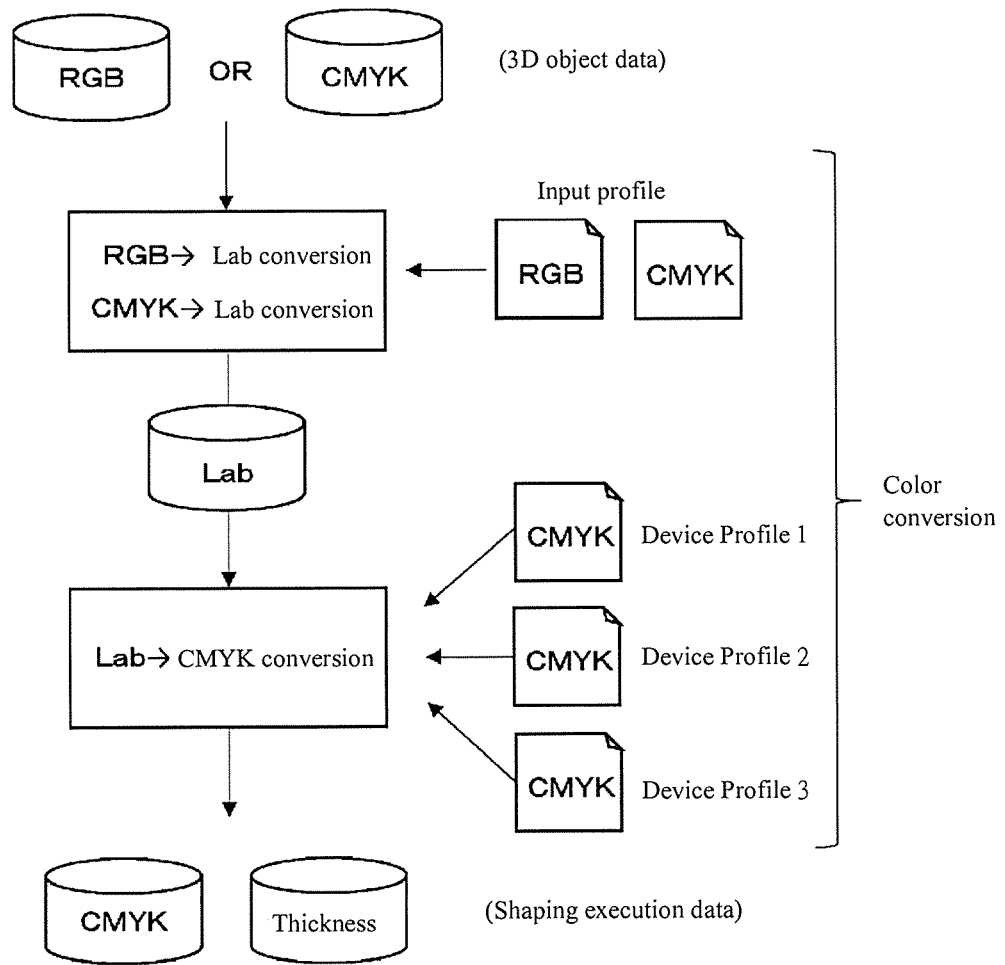
FIG. 4 is a view showing one example of a process of color conversion carried out in a host PC 200.

FIG. 4 is a view showing one example of a process of color conversion carried out in the host PC 200 (see FIGS. 1A and 1B), and shows the outline of the process focusing on a process (colorizing process flow) associated with the color conversion of the processes carried out in the host PC 200. As also described above, in the present example, the host PC 200 generates the shaping execution data indicating the 3D object 50 in a format corresponding to the shaping device 100 (see FIGS. 1A and 1B) based on the 3D object data indicating the 3D object 50 (see FIGS. 1A and 1B) to shape. More specifically, when shaping the colored 3D object 50 with the shaping device 100, the host PC 200 carries out the color conversion, and the like with respect to the 3D object data indicating the 3D object 50 in which at least one part is colored, and generates the shaping execution data in which the color is represented in a format corresponding to the shaping device 100.

Furthermore, in this case, data in which the color is represented in a format that does not depend on the shaping device 100, for example, is used for the 3D object data of before carrying out the color conversion. In such 3D object data, the representation of color can be carried out with an arbitrary color coordinate system such as the RGB color coordinate system, the CMYK color coordinate system, and the like.

In the present example, the host PC 200 carries out the color conversion to the Lab color coordinate system based on an input profile prepared in advance with respect to the color represented in such 3D object data. In this case, the profile is, for example, data that makes an input/output color correspond to a color space. More specifically, an ICC profile can be suitably used for the profile. Furthermore, in the present example, a profile that makes the color used in the 3D object data correspond to the color space of the Lab color coordinate system is used for the input profile. Furthermore, for example, the color represented in the 3D object data with the RGB color coordinate system or the CMYK color coordinate system, for example, is converted to the color represented with the Lab color coordinate system.

Furthermore, after carrying out the color conversion to the Lab color coordinate system, the host PC 200 further uses a device profile prepared in advance in accordance with the property of the shaping device 100 to carry out the color conversion corresponding to the color of the coloring ink used in the shaping device 100. In this case, a plurality of profiles different from each other are used, as shown as device profiles 1 to 3 in the figure, for the device profile.

The device profiles 1 to 3 are examples of a plurality of shaping material profiles. The shaping material profile is a profile corresponding to the shaping material of plural colors. In the present example, the shaping material of plural colors is an ink of each color of CMYK used as the coloring ink. Furthermore, in this case, a profile for converting the Lab value to the color represented with the coloring ink is used for the device profiles 1 to 3. The profile for converting the Lab value to the color represented with the ink for coloring is, for example, a profile that makes the Lab value in the color space in the Lab color coordinate system correspond to the color represented with the coloring ink. More specifically, in the present example, a profile that makes the color space of the Lab color coordinate system correspond to the color of the CMYK color coordinate system corresponding to the color of the coloring ink, as shown in the figure, is used for each of the device profiles 1 to 3.

Furthermore, in this case, a plurality of profiles in which a color reproducing region differs from each other, are used for the device profiles 1 to 3. When referring to the color reproducing region of the profile differing from each other, this means, for example, that the range of color that can be represented on the device side (shaping device 100 side) differs from each other. More specifically, in the present example, a profile made correspond to the coloring region 56 (see FIGS. 1A and 1B) having thicknesses different from each other is used for the device profiles 1 to 3. In this case, as the thickness of the corresponding coloring region 56 differs, the device profiles 1 to 3 become profiles in which the range and size of the gamut differ from each other.

The thickness of the coloring region 56, to which the profile is made correspond, is the thickness of the coloring region 56 to be formed when the relevant profile is used. Furthermore, the thickness of the coloring region 56 is the thickness in a normal direction of the 3D object 50. The normal direction of the 3D object 50 is a direction orthogonal to the surface at each position in the surface of the 3D object 50.

In the present example, the plurality of device profiles (device profiles 1 to 3) are used in the process of generating the shaping execution data indicating one 3D object. In this case, each of the device profiles 1 to 3 is used in the process of color conversion with respect to the positions different from each other.

In this case, the host PC 200 further sets the thickness of the coloring region 56 at the relevant position according to the device profile used in the process of color conversion with respect to each position of the coloring region 56. More specifically, the thickness of the coloring region 56 is set to a thickness made correspond to the device profile. The host PC 200 thereby generates data in which the color represented with the CMYK color coordinate system and the thickness are set with respect to each position of the coloring region 56 as the shaping execution data.

According to such configuration, for example, in accordance with the color to be represented at each position of the 3D object 50, the device profile that can represent the relevant color can be more appropriately used. Furthermore, for example, the color of the entire 3D object 50 can be more appropriately represented even if the color of the entire 3D object 50 cannot be appropriately represented with only one device profile.

Figure 5:
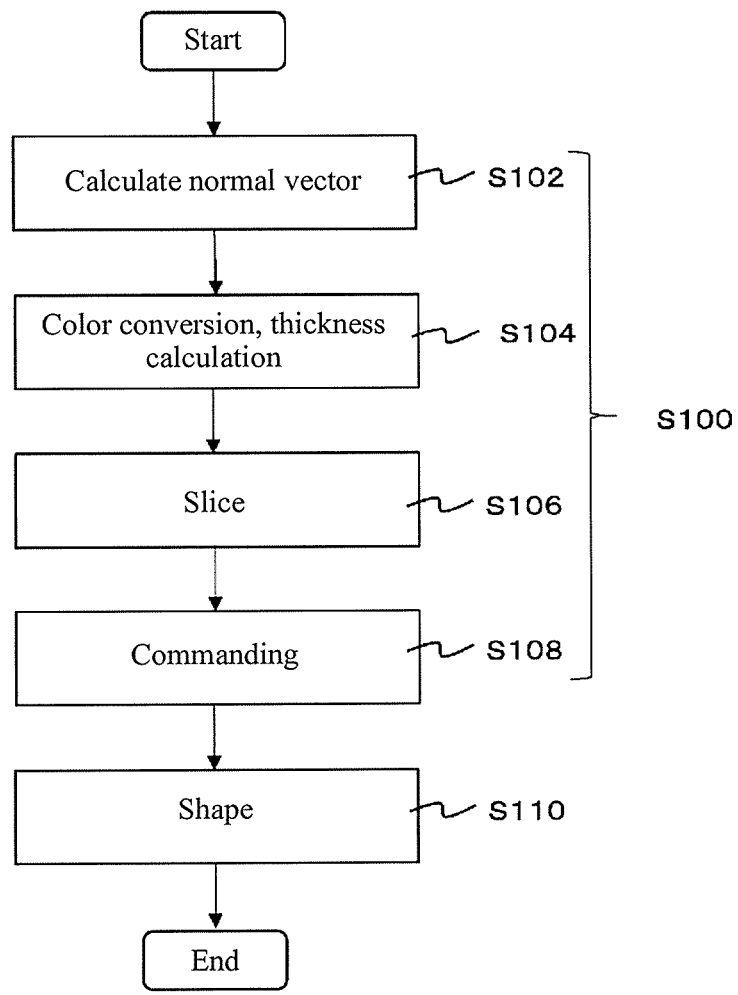
FIG. 5 is a flowchart showing one example of an operation of shaping carried out by the shaping system 10.
Figure 6A:
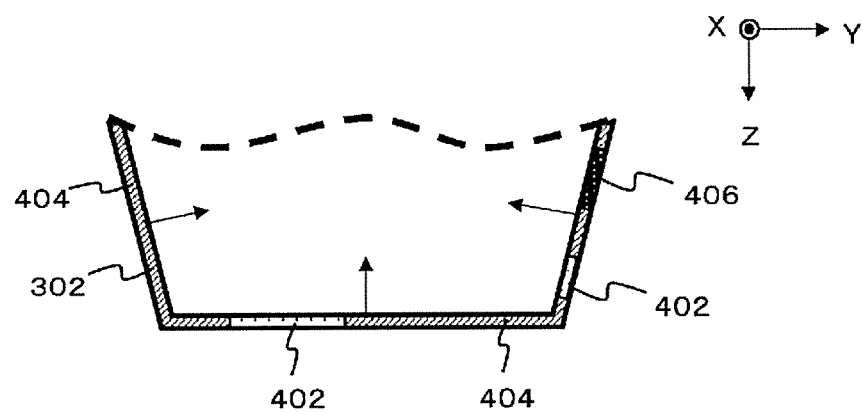
FIGS. 6A to 6C are views schematically showing an operation of one part in the flowchart shown in FIG. 5.
Figure 6B:
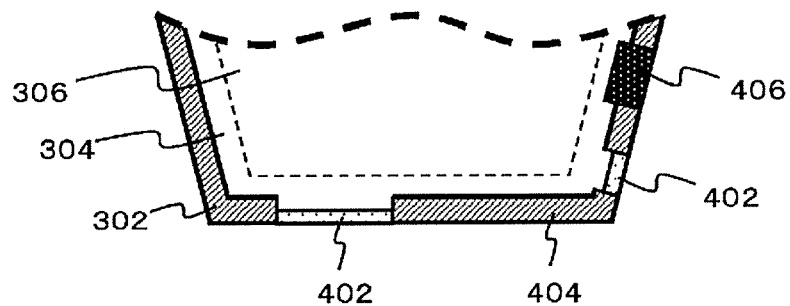
Figure 6C:
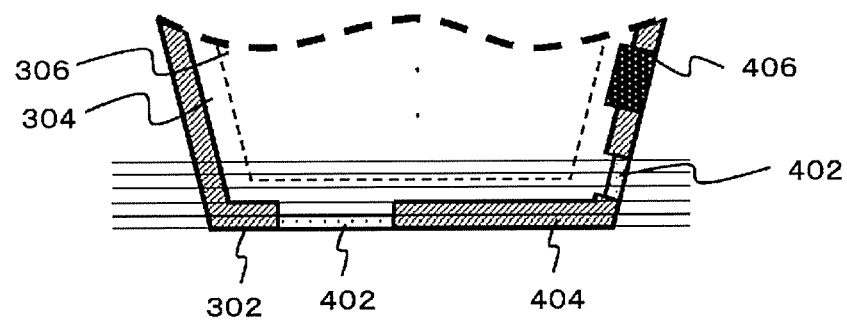

Now, the operation of shaping carried out by the shaping system 10 will be described in further detail. FIGS. 5 and 6 show one example of the operation of shaping carried out by the shaping system 10. FIG. 5 is a flowchart showing one example of the operation of shaping carried out by the shaping system 10. FIGS. 6A to 6C are views schematically showing the operation of one part in the flowchart shown in FIG. 5. FIGS. 6A to 6C schematically show one part of the operation carried out in the host PC 200.

In FIGS. 6A to 6C, the cross-sectional shape of the 3D model obtained by a predetermined process with respect to the 3D object data is schematically shown with respect to the timing of each operation in the flowchart. Furthermore, in FIGS. 6A to 6C, for a case of shaping the 3D object 50 having a shape different from the case shown in FIG. 1B, one part on the upper surface side of the 3D object 50 is omitted, and a cross-sectional view including one part of a lower surface and a side surface is shown, for the sake of convenience of illustration. In this case, the upper surface and the lower surface are surfaces on the upper side and the lower side in the layering direction. The side surface is, for example, a surface connecting the upper surface and the lower surface.

Each operation in the flowchart will be described below. In the present example, the shaping system 10 generates the shaping execution data based on the 3D object data in the host PC 200 (S100). Step S100 is an example of a shaping execution data generating stage. Furthermore, in the operation of step S100, the host PC 200 carries out the process of color conversion described using FIG. 4, and the like.

Furthermore, in step S100, the host PC 200 initially carries out the calculation of a normal vector with respect to the surface of the 3D object 50 to shape (S102). More specifically, in this operation, as shown in FIG. 6A, for example, an inverted normal vector is obtained with respect to each surface of the 3D model indicated by the 3D object data.

In this case, each surface of the 3D model is an outer peripheral surface of the 3D model. Furthermore, obtaining the inverted normal vector with respect to each surface means obtaining an inverted normal vector orthogonal to the outer peripheral surface at a relevant position with respect to each position constituting the outer peripheral surface of the 3D model. Moreover, the inverted normal vector is, as shown in FIG. 6A, for example, a vector (inverted surface normal vector) orthogonal to the outer peripheral surface of the 3D model and directed toward the inner side of the 3D model.

The 3D model shown in FIG. 6A is a 3D model indicated by the 3D object data of before carrying out the color conversion, and a coloring region 302 is set on the surface thereof. The coloring region 302 is a region subjected to coloring in the surface of the 3D model, and for example, is subjected to coloring by adding color information indicating the color of RGB color coordinate system, CMYK color coordinate system, or the like.

At the time of the execution of shaping, the shaping device 100 forms the coloring region 56 (see FIGS. 1A and 1B) of the 3D object 50 based on the coloring region 302. In this case, forming the coloring region 56 based on the coloring region 302 means forming the coloring region 56 based on the coloring region 302 of after carrying out the process of color conversion, and the like described below. Furthermore, in FIG. 6A, a plurality of regions 402, 404, 406 are shown in the coloring region 302 for the sake of convenience of illustration and explanation. However, such regions are regions set in the process of color conversion to be carried out later.

Next, the process of color conversion and the calculation of the thickness (width) of the coloring region 302 are carried out (S104). In this case, the process of color conversion is, for example, the process of color conversion described using FIG. 4. The calculation of the thickness of the coloring region 302 is, for example, adjusting the thickness in the normal direction of each position of the coloring region 302 to a thickness corresponding to the device profile used for the color conversion using the inverted normal vector obtained in step S102.

As also described above using FIG. 4, and the like, in the present example, the host PC 200 carries out the color conversion to the Lab color coordinate system based on the input profile with respect to the color set with the RGB color coordinate system, the CMYK color coordinate system, or the like set in the 3D object data. Furthermore, the color conversion to the CMYK color coordinate system is carried out based on the plurality of device profiles (device profiles 1 to 3) with respect to the color of the Lab color coordinate system of after the conversion.

In this case, the color conversion carried out using the input profile is an example of an operation of a first color conversion step. The first color conversion step is, for example, a stage for carrying out the color conversion of converting the color represented in the 3D object data to the Lab value. Furthermore, the color conversion carried out using the plurality of device profiles is an example of an operation of a second color conversion step. The second color conversion step is, for example, a stage for carrying out the color conversion based on the plurality of device profiles with respect to the Lab value converted in the first color conversion step.

In the present example, after carrying out the color conversion to the Lab color coordinate system and before carrying out the color conversion to the CMYK color coordinate system, the coloring region 302 is divided into a plurality of regions 402, 404, 406, as shown in FIG. 6A, for example. In this case, each of the plurality of regions 402, 404, 406 is a region that uses a device profile different from each other in the color conversion to the CMYK color coordinate system to be carried out later. The region 402 is, for example, a region for carrying out the color conversion using the device profile 1 of the plurality of device profiles 1 to 3. The region 404 is, for example, a region for carrying out the color conversion using the device profile 2. The region 406 is, for example, a region for carrying out the color conversion using the device profile 3. The host PC 200, for example, divides the coloring region 302 to the plurality of regions 402, 404, and 406 based on the range of color set in advance. In this case, the range of color is, for example, a range of color set in advance with the Lab color coordinate system with respect to each device profile.

As also described above, in the present example, each of the plurality of device profiles used for the color conversion to the CMYK color coordinate system is made correspond to a thickness different from each other for the thickness of the coloring region 56 formed at the time of shaping. Thus, in calculating the thickness of the coloring region 302 in the 3D model, the host PC 200 sets the thickness of the coloring region 302 in accordance with the device profile used for the color conversion carried out with respect to each position of the coloring region 302. In this case, setting the thickness of the coloring region 302 in accordance with the device profile means, for example, setting the thickness of the coloring region 302 such that when the coloring region 56 of the 3D object 50 is formed based on the coloring region 302 in the 3D model, the thickness of the coloring region 56 becomes the thickness set in correspondence with the device profile.

More specifically, in the present example, the host PC 200 sets, for the thickness of each of the plurality of regions 402, 404, and 406 in the coloring region 302, the thickness in accordance with the device profile used for the color conversion with respect to each region. For example, as shown in FIG. 6B, the thicknesses of the plurality of regions 402, 404, 406 are thereby differed from each other.

Moreover, in the present example, for example, a light reflective region 304 and an interior region 306 are set with respect to the 3D model in the process carried out in step S104. The light reflective region 304 and the interior region 306 are regions corresponding to the interior region 52 and the light reflective region 54 in the 3D object 50. In this case, the host PC 200 sets, for example, the light reflective region 304 having a thickness set in advance on the inner side of the coloring region 302 in the 3D model. Furthermore, the host PC sets the interior region 306 on the inner side of the light reflective region 304.

As shown in the figure, for example, consideration is made to having the sum of the thickness of the light reflective region 304 and the thickness of the coloring region 302 at a constant thickness, and differing the thickness of each portion of the light reflective region 304 in accordance with the thickness of each portion of the coloring region 302. Furthermore, in a variant of the operation of the host PC 200, the thickness of each portion of the light reflective region 304 may, for example, be set to a constant thickness irrespective of the thickness of the coloring region 302 formed on the outer side.

Following the process of color conversion, and the like carried out in step S104, the host PC 200 carries out the generation of a slice image based on the 3D model of after the process (S106). In this case, generating a slice image means, for example, generating slice data, which is data in which the 3D model is cross-sectioned at a constant interval. Furthermore, the slice image is, for example, an image represented with a layer of ink generated in correspondence with the slice data. More specifically, in this operation, for example, as shown in FIG. 6C, the slice image is generated by slicing the 3D model at an interval of the thickness (layering size of ink) of the layer of ink formed in the shaping device 100. A plurality of slice images, each indicating the cross-section of a position different from each other in the layering direction, are thereby generated based on the 3D object data.

After the generation of the slice image, commanding of the 3D model is carried out based on each generated slice image (S108). In this case, commanding is a process of converting the data of the 3D model to a format that can be executed in the shaping device 100 for executing the shaping, and converts the respective slice images to data of a format with which shaping in the shaping device 100 can be carried out. The host PC 200 thereby generates the shaping execution data indicating the 3D object 50 in a format corresponding to the shaping device 100.

In this case, the commanded slice image becomes, for example, data in which the ink used at the time of shaping in the shaping device 100 is specified with respect to each pixel. Furthermore, the shaping execution data is, for example, configured by a plurality of commanded slice images.

After the execution of step S108, the host PC 200 provides the generated shaping execution data to the shaping device 100. The shaping device 100 thereby executes the operation (layering operation) of shaping based on the shaping execution data (S110). In the present example, step S110 is an example of a shaping execution stage.

More specifically, in step S110, the shaping device 100 discharges the material of shaping based on the shaping execution data received from the host PC 200 to layer a plurality of layers of ink constituting the 3D object 50 one layer at a time and shape the 3D object 50 through the layering and shaping method. In this case, the shaping device 100 forms the coloring region 56 in the 3D object 50 using the coloring ink of plural colors based on the data corresponding to the coloring region 302 in the shaping executing data. In this case, the shaping device 100 executes the layering operation based on the shaping execution data to form each portion of the coloring region 56 at a thickness made correspond to the device profile used for the color conversion with respect to the relevant portion.

Therefore, in the present example, the 3D object 50 in which the surface is colored in color is manufactured by carrying out the processing of data in the host PC 200 and the layering operation by the shaping device 100. Furthermore, in this case, the thickness of the coloring region can be differed depending on the position for the coloring region 56 in the 3D object 50 by using the plurality of device profiles that differ from each other in the process of color conversion carried out in the host PC 200. Thus, each portion of the coloring region 56 can be formed with a thickness suited for the color to color the relevant portion.

Thus, according to the present example, for example, a wider range of colors can be appropriately represented when shaping the colored 3D object 50. Furthermore, for example, the colored 3D object 50 can be more appropriately shaped.

In the operation of the flowchart described above, for example, consideration is made to carrying out the operations up to step S106 of generating the slice image using the data that does not depend on, for example, the model, and the like of the shaping device 100. In the operation after step S108 of carrying out commanding, the data in a format corresponding to the model, and the like of the shaping device 100 is preferably used. In the description made above, a case in which the operation of step S100 is executed by the host PC 200 and the operation of step S110 is executed by the shaping device 100 has been described. However, in a variant of the operation of the shaping system 10, for example, consideration can be made to carrying out some or all of the operations in step S100 in the shaping device 100.

In the description made above, a case of differing the thickness of the coloring region 56 in the 3D object 50 in accordance with the device profile to use has been mainly described in regard to the operation of carrying out shaping using the plurality of device profiles. However, considering the features of the operation of shaping carried out in the present example in a more generalized manner, consideration can be made to focusing on an aspect of carrying out shaping using the plurality of device profiles, not limited to the case of differing the thickness of the coloring region 56 in the 3D object 50 depending on the position. In this case, for example, consideration is made to differing the color of ink to use, the combination, or the like depending on the position of the coloring region 56, and using the plurality of device profiles corresponding to the color, the combination, or the like. More specifically, for example, other than each color of CMYK, a case of further using an ink of a pale color (light color) of at least some colors (e.g., C, M, etc.), using an ink of a pale color only for the coloring of one part of the coloring region 56, and the like for the coloring ink is considered. In this case, for example, use of a device profile used for the color conversion of the portion colored without using the ink of pale color and a device profile used for the color conversion of the portion colored using the ink of pale color for the plurality of device profiles is considered.

INDUSTRIAL APPLICABILITY

The present disclosure can be suitably used in, for example, a shaping method of a 3D object.

What is claimed is:

1. A shaping method for shaping a 3D object, the 3D object is shaped through by layering a plurality of layers, the shaping method comprising:
    shaping execution data generating step, generating shaping execution data that are data indicating the 3D object in a format corresponding to a shaping device that executes an operation of shaping; and
    shaping executing step, shaping the 3D object with the shaping device based on the shaping execution data, the 3D object being shaped using at least a shaping material of plural colors, wherein
    the shaping execution data generating step is a step of carrying out a calculation of an inverted normal vector with respect to each surface of the 3D object, according to the inverted normal vector, generating the shaping executing data based on 3D object data that are data indicating the 3D object in which at least one part is colored, the shaping execution data being generated by at least carrying out color conversion using a plurality of shaping material profiles that are profiles corresponding to the shaping material of plural colors, and the color conversion being carried out using the plurality of shaping material profiles different from each other, and carrying out a generation of a slice data in each layer of the plurality of layers, wherein each layer of the plurality of layers includes a light reflective region formed with a material having a property of reflecting light and a coloring region formed using the shaping material of plural colors on an outer side of the light reflective region.

2. The shaping method according to claim 1, wherein in the shaping execution data generating step, the plurality of shaping material profiles are used in a process of generating the shaping execution data indicating one 3D object.

3. The shaping method according to claim 2, wherein in the shaping execution data generating step, each of the plurality of shaping material profiles is used in the process of color conversion with respect to different positions in the one 3D object.

4. The shaping method according to claim 1, wherein
each of the plurality of shaping material profiles is made correspond to each of different thicknesses of the coloring region, and
in the shaping executing step, the shaping device forms each portion of the coloring region at a thickness corresponding to each of the plurality of shaping material profiles used for the color conversion with respect to a relevant portion.

5. The shaping method according to claim 1, wherein each of the plurality of shaping material profiles is a profile for converting a Lab value to a color represented with the shaping material of plural colors.

6. The shaping method according to claim 5, wherein the shaping execution data generating step includes:
a first color conversion step, carrying out color conversion of converting a color represented in the 3D object data to a Lab value; and
a second color conversion step, carrying out color conversion based on the plurality of shaping material profiles with respect to the Lab value converted in the first color conversion step.

7. A shaping system that shapes a 3D object, the 3D object is shaped through by layering a plurality of layers, the shaping system comprising:
a shaping device that executes an operation of shaping; and
a shaping execution data generating device that generates shaping execution data that are data indicating the 3D object in a format corresponding to the shaping device, wherein
the shaping device is a device that shapes the 3D object based on the shaping execution data, and shapes the 3D object using at least a shaping material of plural colors, and
the shaping execution data generating device is a device that carries out a calculation of an inverted normal vector with respect to each surface of the 3D object, according to the inverted normal vector, generates the shaping execution data based on 3D object data that are data indicating the 3D object in which at least one part is colored, generates the shaping execution data by at least carrying out color conversion using a plurality of shaping material profiles that are profiles corresponding to the shaping material of plural colors, carries out the color conversion using the plurality of shaping material profiles different from each other, and carries out a generation of a slice data in each layer of the plurality of layers, wherein each layer of the plurality of layers includes a light reflective region formed with a material having a property of reflecting light and a coloring region formed using the shaping material of plural colors on an outer side of the light reflective region.

8. A shaping device that shapes a 3D object, the 3D object is shaped through by layering a plurality of layers, wherein
the shaping device shapes the 3D object using at least a shaping material of plural colors based on shaping execution data received from a shaping execution data generating device that generates the shaping execution data that are data indicating the 3D object in a format corresponding to the shaping device, and
the shaping execution data generating device is a device that carries out a calculation of an inverted normal vector with respect to each surface of the 3D object, according to the inverted normal vector, generates the shaping execution data based on 3D object data that are data indicating the 3D object in which at least one part is colored, the shaping execution data generating device generates the shaping execution data by at least carrying out color conversion using a plurality of shaping material profiles that are profiles corresponding to the material for shaping of plural colors, carries out the color conversion using the plurality of shaping material profiles different from each other, and carries out a generation of a slice data in each layer of the plurality of layers, wherein each layer of the plurality of layers includes a light reflective region formed with a material having a property of reflecting light and a coloring region formed using the shaping material of plural colors on an outer side of the light reflective region.

9. The shaping device according to claim 8, wherein
each of the plurality of shaping material profiles is made correspond to each of different thicknesses of the coloring region, and
the shaping device forms each portion of the coloring region at a thickness corresponding to each of the plurality of shaping material profiles used for the color conversion with respect to a relevant portion.

10. The shaping method according to claim 2, wherein
each of the plurality of shaping material profiles is made correspond to each of different thicknesses of the coloring region, and
in the shaping executing step, the shaping device forms each portion of the coloring region at a thickness corresponding to each of the plurality of shaping material profiles used for the color conversion with respect to a relevant portion.

11. The shaping method according to claim 3, wherein
each of the plurality of shaping material profiles is made correspond to each of different thicknesses of the coloring region, and
in the shaping executing step, the shaping device forms each portion of the coloring region at a thickness corresponding to each of the plurality of shaping material profiles used for the color conversion with respect to a relevant portion.

12. The shaping method according to claim 2, wherein each of the plurality of shaping material profiles is a profile for converting a Lab value to a color represented with the shaping material of plural colors.

13. The shaping method according to claim 2, wherein the shaping execution data generating step includes:
   a first color conversion step, carrying out color conversion of converting a color represented in the 3D object data to a Lab value; and
   a second color conversion step, carrying out color conversion based on the plurality of shaping material profiles with respect to the Lab value converted in the first color conversion step.

14. The shaping method according to claim 3, wherein each of the plurality of shaping material profiles is a profile for converting a Lab value to a color represented with the shaping material of plural colors.

15. The shaping method according to claim 14, wherein the shaping execution data generating step includes:
   a first color conversion step, carrying out color conversion of converting a color represented in the 3D object data to a Lab value; and
   a second color conversion step, carrying out color conversion based on the plurality of shaping material profiles with respect to the Lab value converted in the first color conversion step.

16. The shaping method according to claim 4, wherein each of the plurality of shaping material profiles is a profile for converting a Lab value to a color represented with the shaping material of plural colors.

17. The shaping method according to claim 16, wherein the shaping execution data generating step includes:
   a first color conversion step, carrying out color conversion of converting a color represented in the 3D object data to a Lab value; and
   a second color conversion step, carrying out color conversion based on the plurality of shaping material profiles with respect to the Lab value converted in the first color conversion step.

* * * * *